United States Patent [19]
Wu

[11] Patent Number: 5,424,935
[45] Date of Patent: Jun. 13, 1995

[54] POWER CONVERTER WITH A PIEZOELECTRIC CERAMIC TRANSFORMER

[76] Inventor: Donald B. C. Wu, 4F, No. 63, An Ho Road, Sec. 2, Taipei, Taiwan, Prov. of China

[21] Appl. No.: 70,850

[22] Filed: Jun. 3, 1993

[51] Int. Cl.⁶ .......................................... H02M 7/538
[52] U.S. Cl. ...................................... 363/97; 363/133
[58] Field of Search ..................... 363/22, 23, 24, 25, 363/97, 133, 134

[56] References Cited

U.S. PATENT DOCUMENTS 3,706,925 12/1972 Engelhardt ........................ 323/225
4,939,402 7/1990 Hirayama et al. .................. 363/316

*Primary Examiner*—Steven L. Stephan
*Assistant Examiner*—Shawn Riley
*Attorney, Agent, or Firm*—Pro-Techtor International

[57] ABSTRACT

A power convertor wherein a piezoelectric ceramic transformer generates a voltage, a resulting current passes through a load and a comparative voltage generator to generate a comparative voltage. The comparative voltage is amplified and compared to a standard voltage to obtain a control voltage. The control voltage is regulated to provide base potentials of a power amplifier. As a result, variations in a variable resistor will change the comparative voltage to obtain different output currents as required.

7 Claims, 3 Drawing Sheets

POWER CONVERTER WITH A PIEZOELECTRIC CERAMIC TRANSFORMER

BACKGROUND OF THE INVENTION

1. Field of the Invention

The present invention relates to a power converter, and especially to a power converter having a piezoelectric ceramic transformer (P.C.T) which can obtain different output powers, good insulation, and high security.

2. Description of the Prior Art

The present invention relates to a power converter which can convert an input power into different output powers as required.

It is conventional to use a transformer for conversion of power. A conventional transformer includes a silicon steel sheet and coils wound thereon.

Said conventional transformer has the following disadvantages while in use:

1. A large amount of space is required to transform a low voltage into a high voltage, which is not in accord with the requirement for a light, thin and small appliance.
2. Low insulation of components as a silicon steel sheet and coils may lead to high temperature.
3. It often suffers from an electromagnetic interference.
4. A short circuit at the output end may affect the input end to cause a burn-out.
5. It consumes a large amount of power due to loss of heat for high temperature.

In view of the above disadvantages of a conventional device with a transformer for conversion of a power, the present invention has been completed after on improvements of these disadvantages.

SUMMARY OF THE INVENTION

Therefore, it is an object of the present invention to provide a power converter having less volume in a flat shape and lighter weight to be in accord with the requirement for today's electric appliances.

Another object of the present invention is to provide a power converter which is made of non-metals having good insulation, low temperature and resistance to deliquescence.

Yet another object of the present invention is to provide a power converter which does not suffer from an electromagnetic interference and where a short circuit at the output end does not affect the input end to cause a complete burn-out.

A still further object of the present invention is to provide a power converter which consumes a much smaller amount of power for low temperature.

A complete understanding of these and other features and advantages of the present invention will become apparent from a careful consideration of the following detailed description of certain embodiments illustrated in the accompanying drawings.

DETAILED DESCRIPTION OF THE PREFERRED EMBODIMENTS

Figure 1:
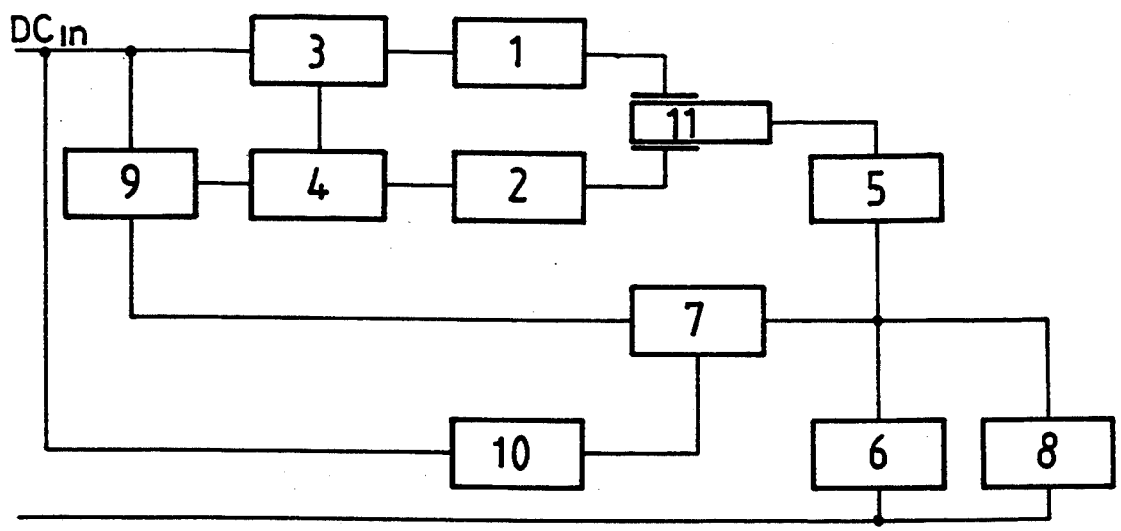
FIG. 1 is a block diagram of the whole assembly of the present invention.

FIG. 1 is a functional block diagram of the whole assembly of the present invention, which includes a driving coil 1, a feedback circuit 2, a current amplifier 3, an oscillating circuit 4, a load 5, a comparative voltage generator 6, a comparative voltage amplifying circuit 7, an output current controller 8, a voltage regulator 9, a standard voltage generating circuit 10, and a piezo-electric ceramic transformer 11. The input end of the current amplifier 3 is connected to the power source and the output end is connected to the piezo-electric ceramic transformer 11 through the driving coil 1. The output end of the piezo-electric ceramic transformer 11 is connected to the load 5. The feedback circuit 2 includes the primary side of the oscillating feedback coil, which is connected to the piezo-electric ceramic transformer 11; and the oscillating circuit 4 includes the secondary side of the oscillating feedback coil, which is connected to the current amplifier 3. Between the oscillating circuit 4 and the load 5, the comparative voltage amplifying circuit 7, the comparative voltage generator 6, and the output current controller 8 are connected to the load 5; the comparative voltage amplifying circuit 7, via the voltage regulator 9, and the standard voltage generating circuit 10 are both connected to the oscillating circuit 4.

Figure 2:
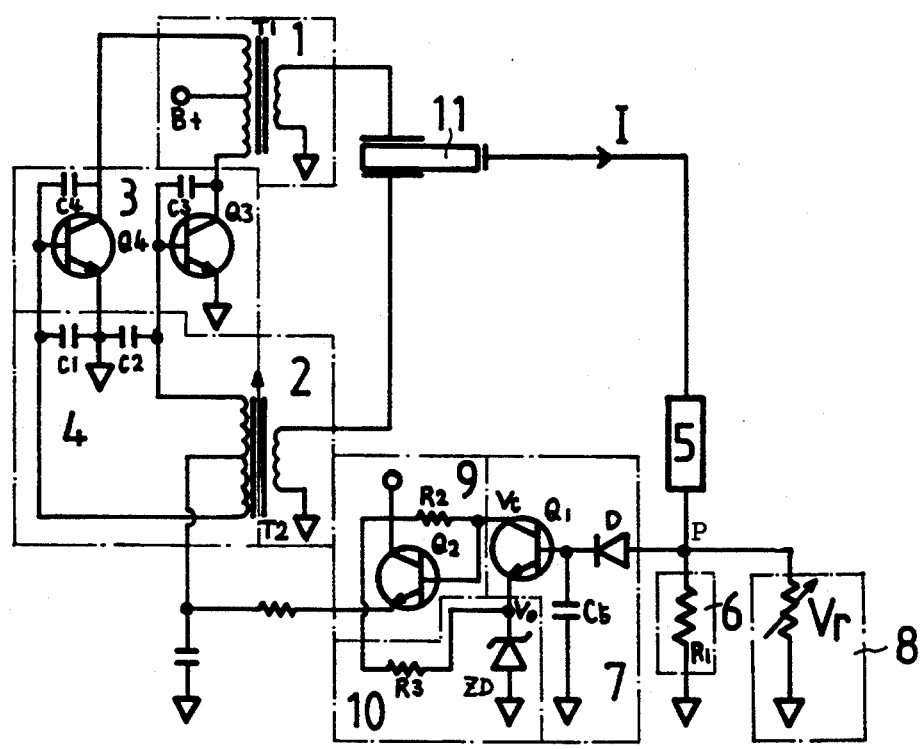
FIG. 2 is a circuit diagram of one embodiment of the present invention.

Referring to FIG. 2, the current amplifier 3 includes amplifying transistors Q3 and Q4 having their collectors connected to the primary side of the driving coil 1. The feedback circuit 2 which is connected to the piezo-electric ceramic transformer 11 includes the primary side of the oscillating feedback coil T2; the oscillating circuit 4 which is connected to the current amplifier 3 includes the secondary side of the oscillating feedback coil T2 in combination with capacitors C1 and C2. The comparative voltage generator 6 includes the resistor R1. The output current controller 8 is a variable resistor VR connected to the load 5. The comparative voltage amplifying circuit 7 includes an amplifying transistor Q1, a capacitor C5, and a diode D which is connected to the base of Q1. The voltage regulator 9 includes a transistor Q2 and a resistor R2 connected to the collector thereof. The base of the transistor Q2 of the voltage regulator 9 is connected to the collector of the transistor Q1 of the above comparative voltage amplifying circuit 7. The standard voltage generator 10 includes a resistor R3 and a Zener diode ZD both of which are located between the emitter of the transistor Q1 and the collector of the transistor Q2.

While in use the power converter of the present invention has a power source inputted into B+, then through the primary side of the driving coil 1, and induces the piezo-electric ceramic tranformer 11 to generate a voltage, of which the current passes the load 5 and the comparative voltage generator 6 to generate a comparative voltage Vp. The comparative voltage Vp is amplified by way of the transistor Q1 of the comparative voltage amplifying circuit 7, and then compared with the standard voltage Vo generated by the standard voltage generating circuit 10 to obtain a control voltage Vc. The control voltage Vc obtained is then regulated by the voltage regulator 9 to provide base potentials of the transistors Q3 and Q4 of the current amplifier 3. Therefore, variations of the resistance of VR will change the comparative voltage Vp of the comparative voltage generator 6 to obtain different output currents as required.

Figure 3:
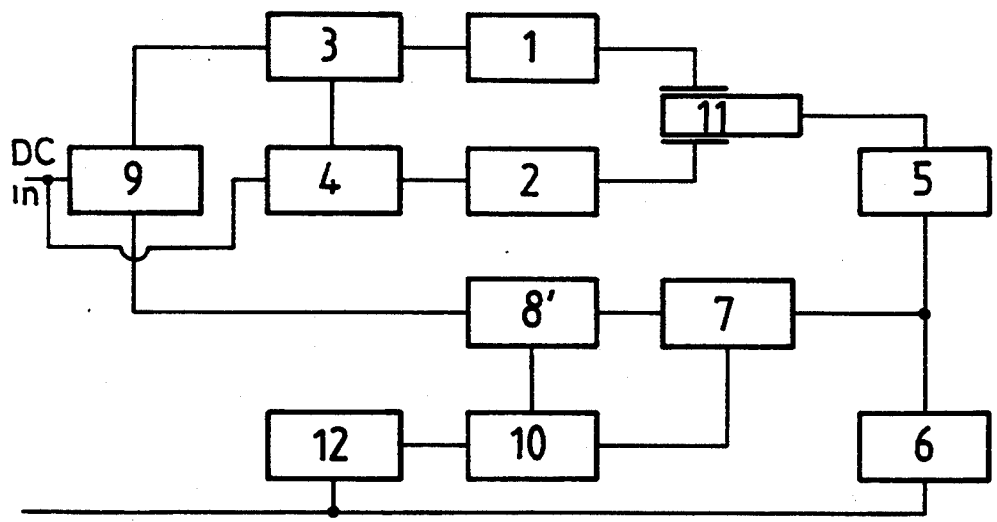
FIG. 3 is a block diagram of another embodiment of the present invention.
Figure 4:
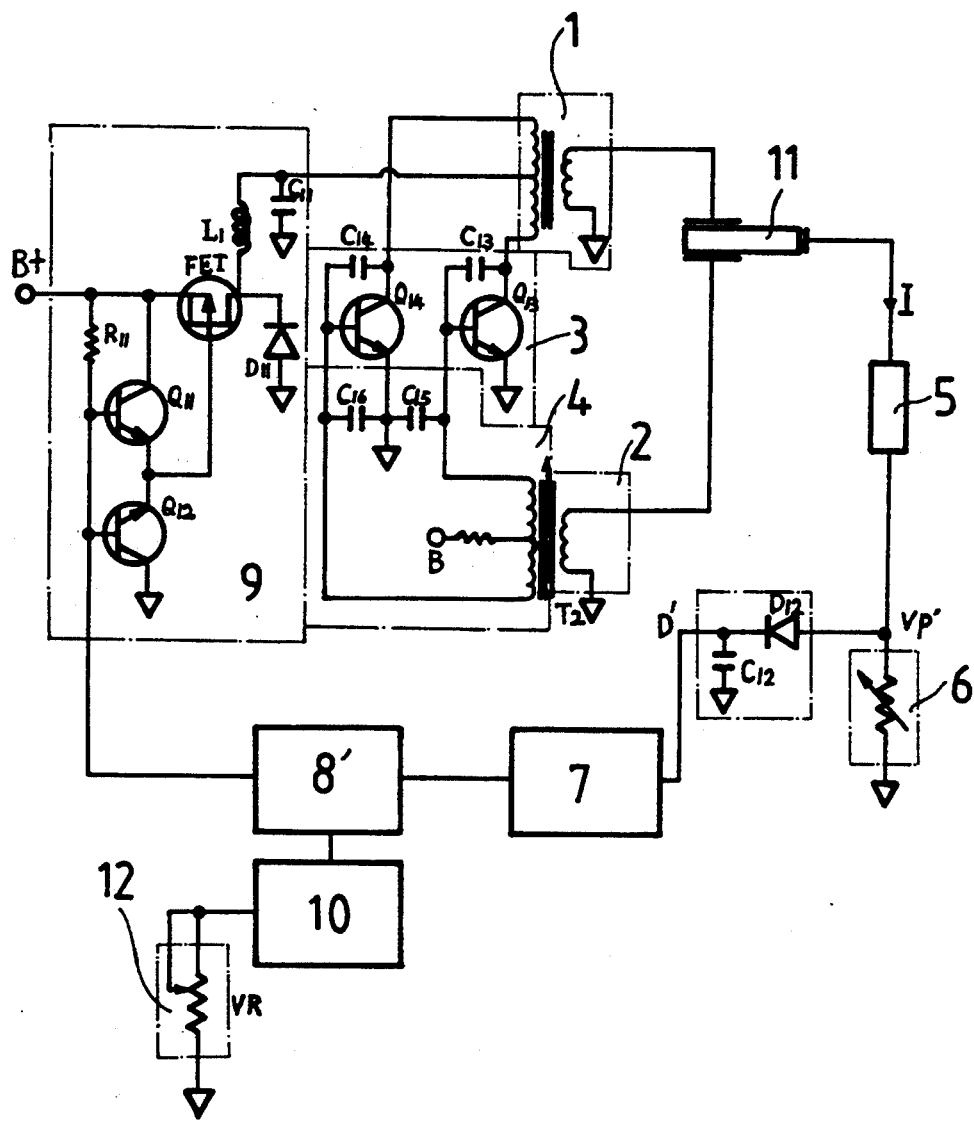
FIG. 4 is a detailed circuit diagram according to the block diagram shown in FIG. 3.

In another embodiment of the present invention as shown in FIG. 3 and FIG. 4, a power source is first inputted into a voltage regulator 9, and a comparative voltage amplifying circuit 7 is connected to a variable resistor VR as an output current regulator 12 via a pulse width regulator 8' and then a standard voltage generating circuit 10. The voltage regulator 9 includes a field effect transistor FET (or transistor, I.C.), and inductor L1 in parallel, a diode D11, and transistors Q11, Q12. In operation, the piezo-electric ceramic transformer 11 generates a voltage, of which the current passes the load 5 and the comparative generator 6 to generate a comparative Vp'. The comparative voltage Vp' is amplified by way of the comparative voltage amplifying circuit 7 including a diode D12 and a capacitor C12 and then compared with the standard voltage generated by the standard voltage generating circuit 10 to make the pulse width regulator 8' generate a pulse with a certain width. This pulse is the operating voltage to control the current amplifier 3 through the voltage regulator 9. Therefore, variations of the resistance of VR will change the standard voltage generated by the standard voltage generating circuit 10 to obtain different output currents as required.

The power converter of the present invention is fit for DC power sources with variant frequencies and voltages, does not suffer from an electromagnetic interference, and has good insulation, low temperature and resistance to deliquescence because the piezoelectric ceramic transformer is used. The power converter also has less volume in a flat shape and lighter weight to be in accord with the requirement for today's electric appliances.

The present invention has been described with reference to the preferred embodiments. As will be evident to those skilled in the art, however, various modifications of this invention can be made or followed in the light of the foregoing disclosure without departing from the spirit and scope of the claims.

I claim:

1. A power convertor comprising:
   a current amplifier which receives a DC input;
   a driving coil having a first side connected to the collectors of multiple transistors of said current amplifier and a second side connected to a piezoelectric ceramic transformer;
   an oscillating feedback coil having a first side connected to said piezoelectric ceramic transformer to form a feedback circuit, and a second side connected to the bases of the transistors of the current amplifier to form an oscillating circuit;
   said piezoelectric ceramic transformer is also connected to a load which is in turn connected to a comparative voltage amplifier circuit, a comparative voltage generator, and an output current controller, the comparative voltage generator and the output current controller being connected to an output of the power convertor;
   a voltage regulator which is connected to said oscillating circuit and to said comparative voltage amplifier circuit, and to said current amplifier; and
   a standard voltage generating circuit which is connected to said comparative voltage amplifier circuit, and to said current amplifier; such that
   said piezoelectric ceramic transformer generates a voltage which creates a current which generates a comparative voltage, the comparative voltage being amplified and then compared with a standard voltage to obtain a control voltage, the control voltage being regulated by said voltage regulator and applied to bases of the transistors of said current amplifier, so that variations of said comparative voltages create variations in output currents as desired by a user.

2. The power convertor of claim 1 wherein:
said current amplifier includes two field effect transistors having their collectors connected to the first side of said driving coil, and said oscillating circuit includes the first side of said oscillating coil and two capacitors.

3. The power convertor of claim 1 wherein:
said comparative voltage generator includes a resistor, said output current controller is a variable resistor connected to said load, and said voltage amplifying circuit includes an amplifying transistor, a capacitor, and a diode which is connected to the base of said amplifying transistor.

4. The power convertor of claim 1 wherein:
said voltage regulator includes a transistor and a resistor connected to the collector thereof, and the base of said transistor of said voltage regulator is connected to the collector of said amplifying transistor of said comparative voltage amplifying circuit.

5. The power convertor of claim 1 wherein:
said standard voltage generator includes a resistor and a Zener diode located between the emitter of said amplifying transistor of said comparative voltage amplifying circuit and the collector of said transistor of said voltage regulator.

6. The power convertor of claim 1 wherein:
a power source is input into said voltage regulator, and said comparative voltage amplifying circuit is connected to a variable resistor as an output current regulator through a pulse width regulator and then said standard voltage generating circuit.

7. The power convertor of claim 1 wherein:
said voltage regulator includes a field effect transistor, an inductor in parallel, a diode, and a pair of transistors.

* * * * *